Patented Feb. 10, 1953

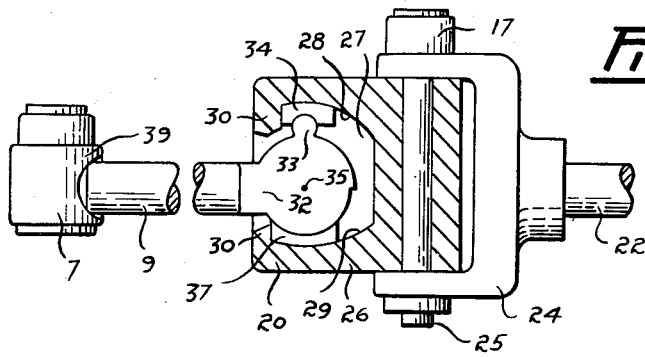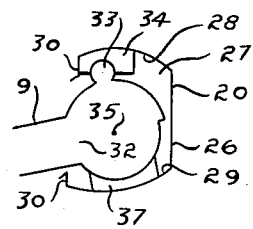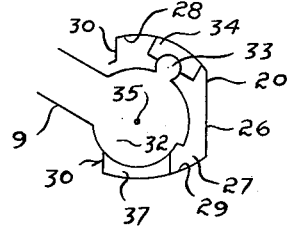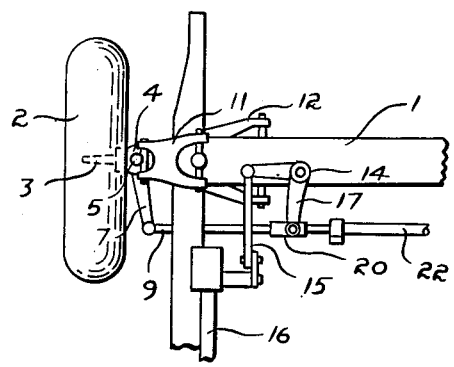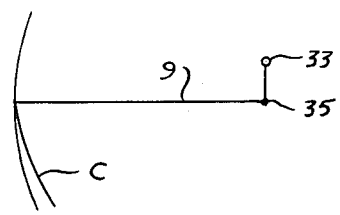

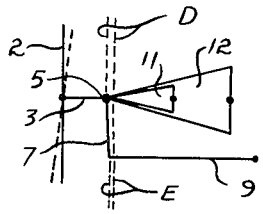
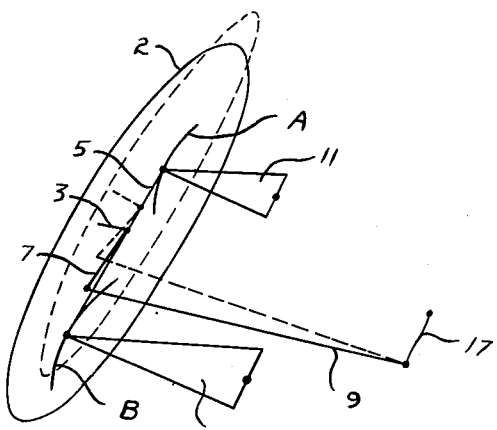
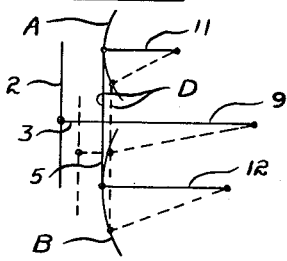
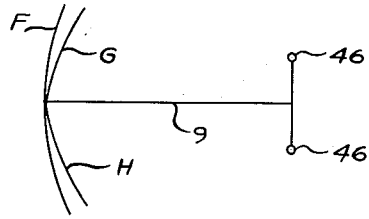
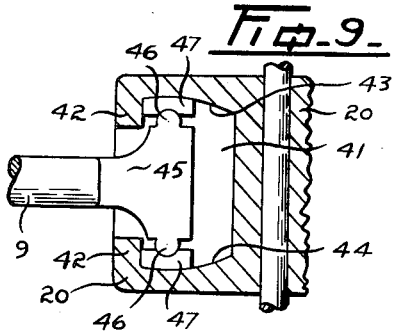
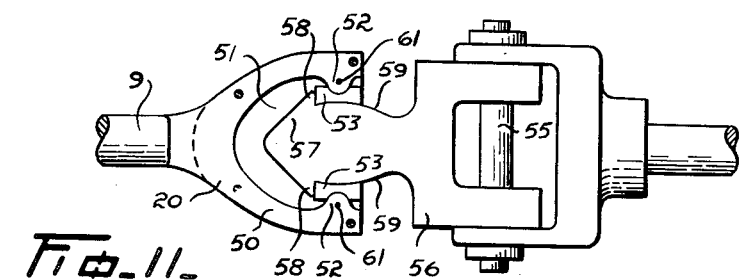

2,628,109

UNITED STATES PATENT OFFICE 2,628,109

PIVOTAL JOINT FOR STEERING PARTS ON VEHICLES HAVING INDEPENDENT FRONT WHEEL SUSPENSION

Herbert T. Cottrell, Vancouver, British Columbia, Canada

Application January 15, 1951, Serial No. 206,082

5 Claims. (Cl. 280—95)

My invention relates to improvements in pivotal joints for steering parts on vehicles having independent front whel suspension where the king pin of each front wheel is mounted to move in a vertical plane in response to loading and road shocks, with the upper end of said pin oscillating about an arc of relatively short radius and the lower end of said pin oscillating about an arc of a greater radius. Each wheel is mounted to be moved by the steering wheel about a vertical axis by means of a steering rod connected at one end to a steering column member and at the other end to an arm integral with the wheel spindle and king pin bearing, which arm is subject to up and down movement relative to the front cross frame member. The steering rod normally employed is fitted with one or more ball joints, so that its outer end can describe any arc resulting from up or down movement of the wheel and consequently since this steering rod is normally mounted, when the plane of the wheel is parallel to the longitudinal axis of the vehicle frame, in a plane parallel to but remote from the axis of the front cross frame member the outer or wheel end of the steering rod will move inwardly as the wheel rises above its normal horizontal plane and also as it drops below said plane. This above mentioned inward movement obviously swings the wheel horizontally about the king pin and in some cases the wheel movement in said horizontal plane will be different per given unit of lift above the wheel's normal horizontal plane than its movement below said normal plane. In other cases the swing of the wheel about the king pin may be of the same magnitude for movement above and below the normal horizontal plane. In any case, by the use of steering rods and fittings as now conventionally used between the steering gear and the wheel spindle the wheel must turn somewhat about that portion of its tread which is in contact with the ground when said wheel is either moving up or down with respect to its normal horizontal position relative to the cross frame member.

The objects of the invention are to provide a steering fitting adapted to be applied to or adjacent one end of the steering rod of each independently sprung front wheel of a vehicle and connected to the outer end of the steering arm of a front wheel spindle which will compensate for the decrease in distance between the connected parts, so that the wheel will not turn about a vertical axis when it moves up or down with respect to the cross member of the chassis unless urged to do so by movement of the steering wheel.

Referring to the drawings:

Figure 1 is a plan view of one front wheel suspension with a steering rod connecting a spacer rod with the steering arm of a wheel spindle bearing, indicating the desired position of the invention.

Figure 2 is a longitudinal sectional view of the swinging joint as adapted for use in overcoming turning movement of the wheel and its spindle when dropping below the normal horizontal position of the wheel relative to the front cross frame member.

Figure 3 is a diagrammatic view of the parts of the joint when the wheel spindle is dropped beyond normal position.

Figure 4 is a diagrammatic view of the parts when the wheel spindle is raised above normal position.

Figure 5 is a diagram showing the normal path of the centre point of the king pin as it moves above and below the normal position.

Figures 6, 7 and 8 are respectively diagrammatic plan view, elevational view and a perspective view of the movements of the several parts of a conventional wheel suspension and the effect of the swinging joint upon said movements.

Figure 9 is a modified form of the joint to overcome conventional wheel swing which takes place as the wheel spindle moves both above and below the normal horizontal position.

Figure 10 is a diagram showing the normal arc of travel of the centre point of the king pin and the arc of travel as produced by the joint as shown in Figure 9.

Figure 11 is a further modification adapted to function to correct the same defect as that of Figure 9, but showing the female portion of the joint mounted on the steering rod instead of being on the vertically pivoted part as shown in Figure 2.

In the drawings like characters of reference indicate corresponding parts in each figure.

The term "normal position" herein referred to indicates the position of the front wheel spindle below the front cross frame member when the car is at rest and the vehicle is without load. The term "centre point" is intended to indicate the height along the king pin which is level with the free end of the arm on the wheel spindle bearing and the term "centre arc" is intended to indicate the arc along which the centre point moves in a vertical plane as the wheel and its spindle move above or below the centre point incidental to road bumps or road depressions.

Referring to Figure 1, the numeral 1 indicates the front cross frame member of a vehicle chassis at the ends of which front wheels 2, one only shown, are connected. Each front wheel is fitted on a spindle 3 of a spindle bearing 4 and the spindle bearing is journaled about a substantially vertical member 5 herein referred to as a king pin. Extending rearwardly of the spindle bearing 4 is a steering arm 7 to which a steering rod 9 is adapted to be connected. The king pin 5 is hingedly connected at its upper and lower end to the cross frame member 1 by wish-bone plates or links 11 and 12 respectively, and the links are hingedly connected to the frame member 1 in the conventional manner. In the conventional wheel mounting the length of the upper link 11 is shorter than the length of the lower link 12, so that as they swing in a vertical plane due to wheel lift or drop, their free or king pin ends describe arcs of different radii, as A and B respectively in Figures 7 and 8.

Mounted upon the cross frame member 1 is a bell crank 14 which is moved by an appropriate operating train 15 from the steering column 16. The bell crank 14 is provided with an arm 17 by which it is pivotally connected to a swinging joint 20, which in turn is connected to a steering rod 9 and a spacer rod 22. The preferred arrangement as between the steering arms 7 is with steering rods extending inwardly from each arm 7 and a spacer rod 22 between the rods and a bell crank connected to or adjacent the inner end of each steering rod. If the bell crank 14 is spaced from the horizontal centre of the cross frame member, a spacer rod will obviously be required, but if its arm 17 is centrally placed on the cross frame member no spacer rod will be used. Since both these assemblies are common practice, specific showing is not deemed to be necessary. The pivotal joint 20 which is the basis of the invention, consists of a fork 24 adapted for connection to the spacer rod 22, see Figure 2. Swingingly mounted within the fork and upon a pin 25 is a yoke 26 having a transverse opening 27. The opening 27 has an upper arcuate guide 28 and a lower arcuate guide 29, each of which terminate at the open end of the yoke at stops 30. The steering rod 9 is provided with a rocking head 32 which is housed within the opening 27 and is adapted to be retained therein by cover plates, not shown, which are secured to the faces of the yoke. The rocking head has a rounded upward projection 33 which is mounted in an upper slipper 34. The slipper has sliding movement along the arcuate guide 28. The lower side of the head 32 is rounded about the centre 35 and rocks in a slipper 37 having sliding movement along the arcuate guide 29. The radii of the guides 28 and 29 are different and their arcs converge towards the base of the opening and the pin 25 so that the head of the steering rod 21 cannot move inwardly into said opening so long as the rod remains on its normal horizontal position as shown, but if the spindle bearing and its arm 7 move upward above said position, the universal joint 39 connecting the steering rod to the steering arm will move also, rocking the steering rod about the axis 35. This movement causes the projection 33 and its slipper to move inwardly as indicated in Figure 4. This movement above the normal horizontal position does not change the arc which the outer or universal joint end of the steering rod would have described if the conventional steering rod joint to bell crank 17 had been used.

Since the radius of swing of the steering rod is greater than the radius of vertical swing of the centre of the king pin, it will be obvious that for a given rise or fall of the outer end of said rod and that of the king pin that the steering spindle will be caused to turn about the king pin and that the king pin will move in towards the longitudinal axis of the vehicle as the wheel lifts above or when it drops below its normal position. Likewise in some cases, depending on the setting of the fulcrum points of the wheel suspension and that of the king pin, the inward movement of both king pin and rod end may be the same or one inward movement only may differ. In view of the above by providing means such as that here described for appropriately shortening the length between the universal joint and the pin on which the joint 20 swings during the time that the steering arm is moving up and down, or down only as the case may be, the steering arm can be made to travel inwards parallel to itself without turning about its vertical axis. When the steering rod 9 moves down below the normal horizontal position, it fulcrums about the centre of the projection 33 and since the upper slipper 34 is against its stop 30, as shown in Figure 3, said downward movement will cause the slipper 37 to slide along the guide 29 away from its stop and will cause the head 32 to retract into the opening, thus changing the arc then described, as indicated at C in Figure 5.

In Figures 6 and 7, the steering arm 7 is shown as being substantially parallel to the longitudinal axis of the vehicle, the distance between the normal line position of the king pin and its position when lowered relative to said line is as between the dotted lines D, whereas the inward travel of the parts in an assembly using the conventional steering rod and swinging in the same length of arc as the king pin centre, would be only equal to that indicated between the dotted lines E, but when the presently described joint is incorporated into the steering rod and the fulcrum of rod is changed as shown in Figure 3, the distance E is increased to equal the distance D.

Referring to Figure 8, the steering rod and wheel suspension parts of the conventional structure is shown in solid line, the steering rod being disposed in normal position, the dotted lines indicate the position of the steering rod, steering arm, wheel spindle and wheel when raised above said normal position. In Figure 8 it will be clearly seen that the plane of the wheel changes from straight position parallel to the longitudinal axis of the frame to a "toe in" position as the wheel lifts, in spite of the fact that the bell crank arm, through which steering is effected, has not been moved.

Referring to Figure 9, the joint 20 is designed to give similar correction both above and below the normal position as indicated in Figure 10 where F indicates the normal arc traversed by the king pin centre and G and H indicate respectively the necessary arcs of travel of the free end of the steering rod to prevent wheel movement about the king pin. The opening 41 has stops 42 at its outer end and upper and lower arcs 43 and 44 respectively of identical radii, the head 45 of the rod 9 is provided with extensions 46 which rock in identical slippers 47 so that as the rod moves up or down with relation to the normal line, said steering rod will swing about fulcrums different to the centre of the head itself.

In the modification shown in Figure 11, a joint is provided for use where it is desirable to reverse the positions of the operating parts and to provide the socket end of the joint as an integral part of the steering rod, the modification shown being designed to effect equal correction both above and below the normal line as in Figure 9. A socket 50 is provided at one end of the steering rod 9 and is provided with a transverse opening 51 having rounded inwardly directed projections 52 upon each of which a slipper 53 is rockingly mounted. Swingingly mounted upon a vertical pin 55 is a member 56 having a protuberance 57 provided with a stop 58 on its upper and lower edges adjacent its free end. The upper and lower edges 59 are arcuate and converge towards the pin 55, the radius of each of these arcs is drawn from the centre 61 of the projection 52 remote therefrom. In this modification when the steering rod is raised it will rock about the lower projection 52 and the upper slipper 53 will slide along the arc of the upper edge of the protuberance, thus producing the desired shortening as between centres to prevent wheel turning incidental to vertical wheel movement.

It will be noticed that the arcs described by the joints in the different modifications are all drawn about centres which are more or less adjacent to the centres of the arc or arcs described by the centre of the king pin. If, however, it is necessary for the correcting arc or arcs to be swung about a centre or centres located outside the king pin or beyond the side of the vehicle chassis, this can be accomplished by providing the steering rods with an appropriately designed swinging joint at each end.

What I claim as my invention is:

1. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a member having a transverse opening with upper and lower arcuate guides and a stop integral with each guide, a head member adapted for connection to the steering rod, said upper and lower guides being of different contour, a slipper slidable along each of the guides, and each of said slippers having a recess adapted to rockingly cradle a side part of the head.

2. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a fork member having two prongs and a protuberance adapted for connection to a steering part, a slipper pivotally supported adjacent the outer end of each prong, said protuberance being rockingly mounted between the slippers and means for preventing the endwise movement of an upper part of the protuberance with respect to a slipper as the fork is lowered beyond a predetermined line, and means for preventing the endwise movement of the lower part of the protuberance with respect to the other slipper as the fork is raised above said predetermined line.

3. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a fork member having two prongs and a protuberance adapted for connection to a steering part, a slipper pivotally supported adjacent the outer end of each prong, said protuberance rockingly mounted between the slippers and means for preventing the endwise movement of an upper part of the protuberance with respect to a slipper as the fork is lowered beyond a predetermined line, said protuberance having one stop causing it to rock about one of the slippers and slide within the second slipper and another stop causing said protuberance to rock about the second slipper and slide within the first slipper.

4. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a member having a transverse opening with upper and lower arcuate guides and a stop integral with each guide, a head member adapted for connection to the steering rod, said head member having upper and lower sides, a slipper interposed between the upper side of the head and the upper arcuate guide, and a slipper interposed between the lower side of the head and the lower arcuate guide, said head being adapted to rock about one centre when the slipper of the upper guide is abutting its stop and to rock about another centre when the slipper of the lower guide is abutting its stop.

5. A pair of steering rods for a vehicle having independent front wheel suspension, said steering rods being adapted for connection between a manually operated arm of the vehicle steering mechanism and the steering arms of the spindle bearings, each of said rods having a part connecting joint at each end, one of said joints having two fulcrums about which its connected rod may have movement in a single plane, said joint having articulated male and female members, a pair of slippers interposed between the male and female members, said slippers being on opposite sides of the male member and being slidably engaged by the male member, one side of the male member being mounted to rock about one slipper from one of the fulcrums and the opposite side of said male member being mounted to rock about the opposite slipper from the other fulcrum.

HERBERT T. COTTRELL.

REFERENCES CITED

The following references are of record in the file of this patent:

UNITED STATES PATENTS

| Number | Name | Date |
|---|---|---|
| 1,919,797 | Maurer | July 25, 1933 |
| 1,959,563 | Baker | May 22, 1934 |
| 2,115,256 | Echenrode | Apr. 26, 1938 |
| 2,130,288 | Olley | Sept. 13, 1938 |
| 2,173,667 | Slack | Sept. 19, 1939 |
| 2,470,210 | Booth | May 17, 1949 |

FOREIGN PATENTS

| Number | Country | Date |
|---|---|---|
| 115,675 | Sweden | Jan. 15, 1946 |